United States Patent
Emura et al.

(10) Patent No.: US 9,150,277 B2
(45) Date of Patent: Oct. 6, 2015

(54) BICYCLE CRANK ASSEMBLY

(71) Applicant: Shimano Inc., Osaka (JP)

(72) Inventors: Atsuhiro Emura, Osaka (JP); Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 46 days.

(21) Appl. No.: 14/149,168

(22) Filed: Jan. 7, 2014

(65) Prior Publication Data
US 2015/0191214 A1   Jul. 9, 2015

(51) Int. Cl.
*B62M 3/00*   (2006.01)

(52) U.S. Cl.
CPC .............. *B62M 3/00* (2013.01); *Y10T 74/2165* (2015.01)

(58) Field of Classification Search
CPC .......... B62M 9/02; B62M 9/105; B62M 1/36; F16H 55/30; F16H 55/303; Y10T 74/2164; Y10T 74/2165
See application file for complete search history.

(56) References Cited

U.S. PATENT DOCUMENTS

| | | | |
|---|---|---|---|
| 4,174,642 A | 11/1979 | Martin et al. | |
| 4,384,865 A * | 5/1983 | Ueno | 474/160 |
| 4,598,608 A * | 7/1986 | Ueno | 74/594.2 |
| 6,666,786 B2 * | 12/2003 | Yahata | 474/152 |
| 2007/0054768 A1 | 3/2007 | Miyazawa | |
| 2013/0109519 A1 | 5/2013 | Morita | |
| 2013/0139642 A1 | 6/2013 | Reiter et al. | |

OTHER PUBLICATIONS

U.S. Appl. No. 14/053,630, filed on Oct. 15, 2013, Akinobu Sugimoto et al. (unpublished).

* cited by examiner

*Primary Examiner* — Thomas Diaz
(74) *Attorney, Agent, or Firm* — Global IP Counselors (57) ABSTRACT

A bicycle crank assembly includes a crank arm and at least one sprocket. The sprocket includes a set of regular teeth and a set of first and second teeth. The first teeth have a first chain engaging tooth width for engaging outer links of a bicycle chain. The second teeth have a second chain engaging tooth width for engaging inner links of the bicycle chain. The first chain engaging tooth width is greater than the second chain engaging tooth width. The regular teeth have a third chain engaging tooth width being smaller than the first chain engaging tooth width. The regular teeth are disposed along at least one of top and bottom dead center areas with respect to the crank arm. The first and second teeth are disposed along at least between the top and bottom dead center areas with respect to the crank arm.

14 Claims, 9 Drawing Sheets

BICYCLE CRANK ASSEMBLY

BACKGROUND

1. Field of the Invention

This invention generally relates to a bicycle crank assembly that includes one or more bicycle sprockets.

2. Background Information

Most bicycles have a drive unit or drive train that uses a chain to transmit the pedaling action from the rider to the rear wheel. A bicycle drive train typically has one or more front sprockets provided on a bicycle crank assembly of the bicycle and one or more rear sprockets provided on a rear hub of the bicycle. The chain wraps around the front and rear sprockets. Thus, rotation of the bicycle crank assembly by the rider is transmitted to the rear wheel by the chain, which meshes with the front and rear sprockets. A bicycle chain has a plurality of inner links and a plurality of outer links that are interconnected in an alternating manner by a plurality of pins. Typically, each of the inner links includes a pair of parallel inner link plates connected by the pins that are surrounded by cylindrical rollers. Each of the outer links includes a pair of parallel outer link plates connected by the pins of the adjacent inner links. In this way, the inner links and the outer links are linked alternately. Therefore, when the teeth of a sprocket all have the same thickness, gaps occur between the outer link plates and the teeth of the sprocket that are larger than the gaps between the inner link plates and the teeth of the sprocket. In view of this situation, sprockets have been proposed in which the axial widths of the teeth meshing with the outer links are greater than the axial widths of the teeth meshing with the inner links (see, for example U.S. Pat. No. 4,174,642).

SUMMARY

Generally, the present disclosure is directed to various features of a bicycle crank assembly that basically includes a crank arm and at least one sprocket. In one feature, a bicycle crank assembly is provided with a sprocket having teeth of different axial widths relative to a rotational center axis direction of the sprocket for preventing the chain from easily separating from the teeth of the sprocket.

In view of the state of the known technology and in accordance with a first aspect of the present disclosure, a bicycle crank assembly is provided that basically comprises a crank arm and at least one sprocket. The at least one sprocket has a rotational center axis and a plurality of teeth formed about a periphery of the at least one sprocket. The plurality of teeth includes a set of regular teeth and a set of first and second teeth. The first teeth have a first chain engaging tooth width for engaging an outer link of a bicycle chain. The second teeth have a second chain engaging tooth width for engaging an inner link of the bicycle chain. The first chain engaging tooth width is greater than the second chain engaging tooth width. The regular teeth have a third chain engaging tooth width being smaller than the first chain engaging tooth width. The regular teeth are disposed along at least one of a top dead center area and a bottom dead center area with respect to the crank arm. The first and second teeth are disposed along at least between the top dead center area and the bottom dead center area with respect to the crank arm.

In this bicycle crank assembly, the chain is mounted to the sprocket so that the first tooth of greater axial width engages with an outer link, and the second tooth of less axial width than the first tooth engages with an inner link.

In accordance with a second aspect of the present invention, the bicycle crank assembly according to the first aspect is configured so that the crank arm has a sprocket attachment part, a pedal attachment part and a longitudinal center line extending between the sprocket attachment part and the pedal attachment part.

In accordance with a third aspect of the present invention, the bicycle crank assembly according to the second aspect is configured so that the top dead center area and the bottom dead center area that includes the regular teeth is equal to or less than forty-five degrees in each direction from the longitudinal center line of the crank arm.

In accordance with a fourth aspect of the present invention, the bicycle crank assembly according to the second aspect is configured so that the at least one sprocket is attached to the sprocket attachment part of the crank arm.

In accordance with a fifth aspect of the present invention, the bicycle crank assembly according to the first aspect is configured so that the first teeth and the second teeth are alternately disposed in a circumferential direction. In this case, the chain can be more effectively prevented from easily separating from the teeth of the sprocket.

In accordance with a sixth aspect of the present invention, the bicycle crank assembly according to the first aspect is configured so that the regular teeth are disposed along both the top dead center area and the bottom dead center area.

In accordance with a seventh aspect of the present invention, the bicycle crank assembly according to the first aspect is configured so that the regular teeth are taller than the first teeth and the second teeth as measured in a radial direction from a tooth root radius to a tooth tip.

In accordance with an eighth aspect of the present invention, the bicycle crank assembly according to the first aspect is configured so that a total number of the plurality of teeth is even. In this case, the first teeth can be made to reliably engage with the outer link, while the second teeth can be made to reliably engage with the inner link.

In accordance with a ninth aspect of the present invention, the bicycle crank assembly according to the first aspect is configured so that the first chain engaging tooth width of the first teeth is in a range from 2.5 mm to 5.4 mm. In this case, the first teeth can be made to engage with the outer link instead of the inner link.

In accordance with a tenth aspect of the present invention, the bicycle crank assembly according to the ninth aspect is configured so that the second chain engaging tooth width of the second teeth is in a range from 1.5 mm to 2.3 mm. In this case, the second teeth can be made to reliably engage with the inner link.

In accordance with an eleventh aspect of the present invention, the crank assembly according to the first aspect is configured so that the second chain engaging tooth width of the second teeth is in a range from 1.5 mm to 2.3 mm. In this case, the second teeth can be made to reliably engage with the inner link.

In accordance with a twelfth aspect of the present invention, the crank assembly according to the first aspect is configured so that the at least one sprocket consists of only a single sprocket, and only the single sprocket is attach to the crank arm.

Also other objects, features, aspects and advantages of the disclosed bicycle crank assembly will become apparent to those skilled in the art from the following detailed description, which, taken in conjunction with the annexed drawings, discloses selected embodiments of the bicycle crank assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
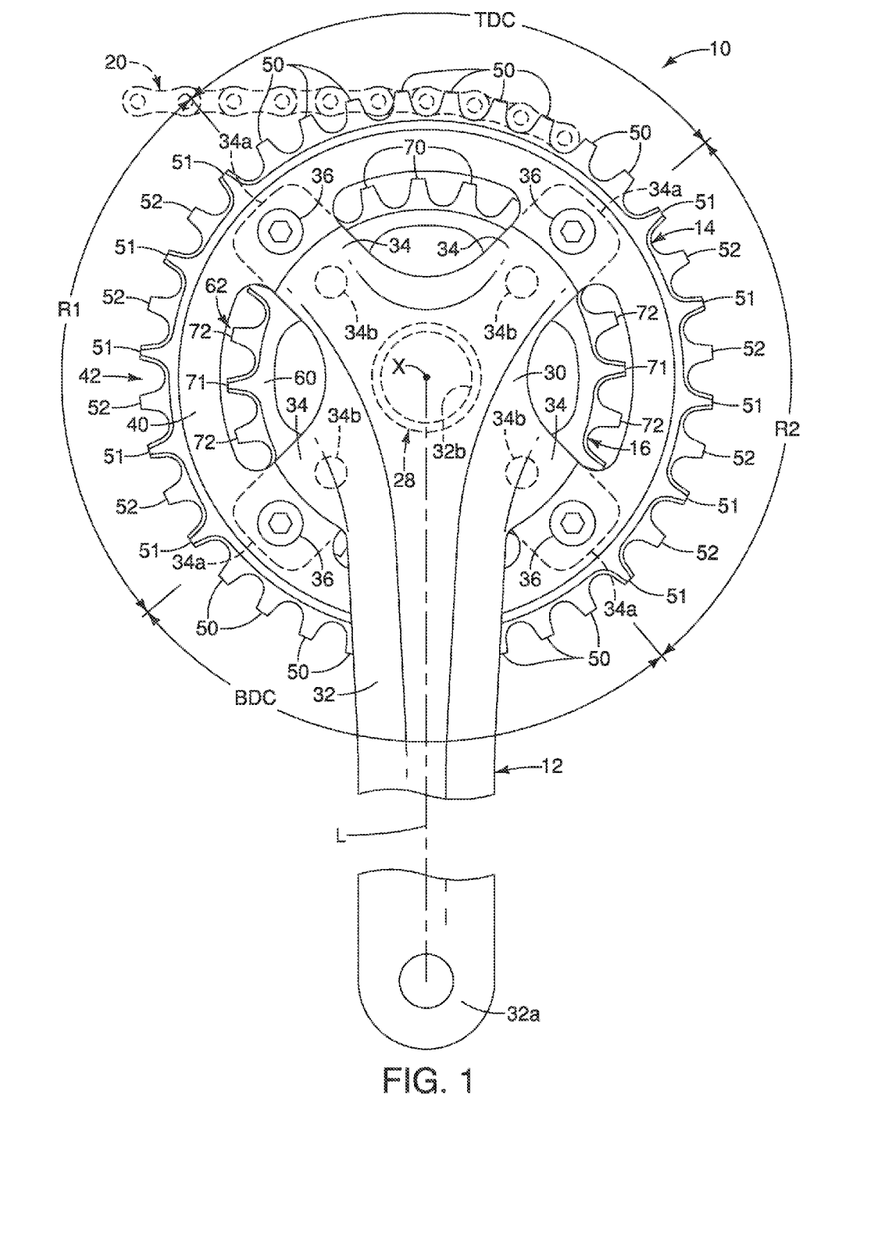
FIG. 1 is an outside elevational view of a bicycle crank assembly having first and second sprockets configured in accordance with a first embodiment.

Referring initially to FIG. 1, a bicycle crank assembly 10 according to a first embodiment is illustrated. In the first embodiment, the bicycle crank assembly 10 comprises a crank arm 12, a first sprocket 14 and second sprocket 16. More broadly speaking, the bicycle crank assembly 10 basically comprises a crank arm and at least one sprocket. The first and second sprockets 14 and 16 are bicycle sprockets according to an embodiment. The second sprocket 16 has fewer teeth than the first sprocket 14. The first and second sprockets 14 and 16 are front sprockets that can engage with a bicycle chain 20.

Figure 2:
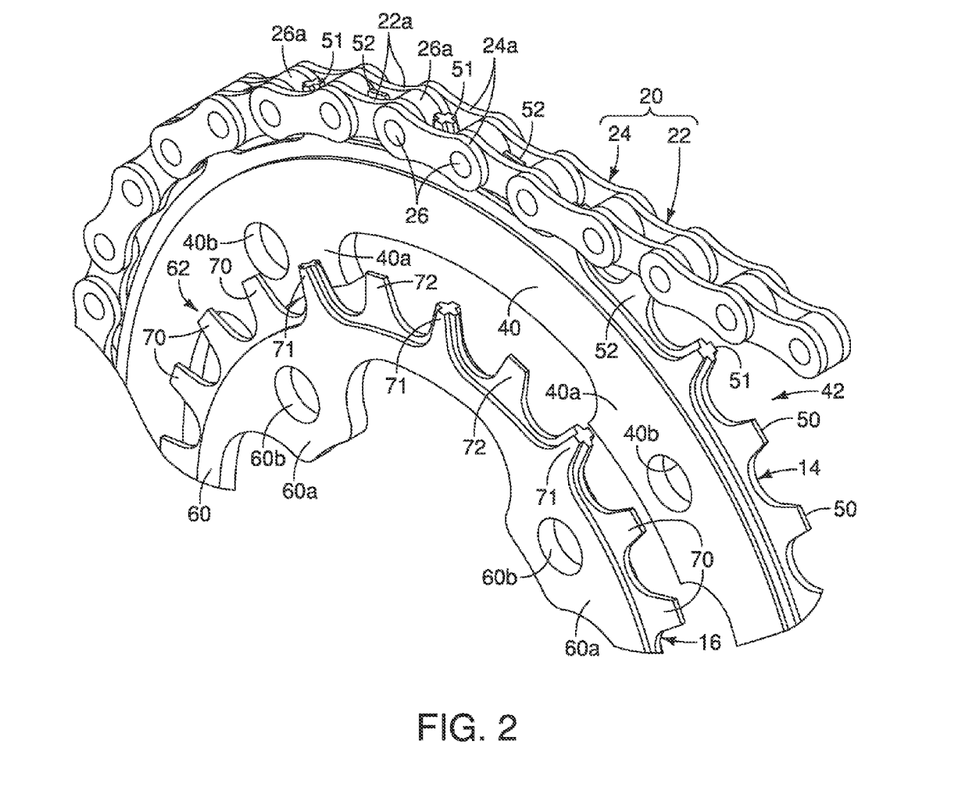
FIG. 2 is a partial inside perspective view of the first and second sprockets of the bicycle crank assembly illustrated in FIG. 1 with a bicycle chain engaged with the teeth of the first (larger) sprocket.

As seen in FIG. 2, the bicycle chain 20 has a plurality of inner links 22 and a plurality of outer links 24 that are interconnected in an alternating manner by a plurality of pins 26. Typically, each of the inner links 22 includes a pair of parallel inner link plates 22a. Each of the outer links 24 includes a pair of parallel outer link plates 24a. Preferably, each of the pins 26 has a roller 26a that is rotatably disposed thereon. Thus, the bicycle chain 20 is a conventional bicycle chain.

The crank arm 12 is integrally and non-rotatably fixed to one end of a crankshaft 28. Typically, a second crank arm (not shown) is non-rotatably attached to the other end of the crankshaft 28. The crankshaft 28 defines a rotational center axis X of the first and second sprockets 14 and 16. The at least one sprocket (e.g. the first and second sprockets 14 and 16) has a rotational center axis X. The crank arm 12 has a sprocket attachment part 30 and an arm part 32 provided with a pedal attachment part 32a. The crank arm 12 has a longitudinal center line L that extends between the sprocket attachment part 30 and the pedal attachment part 32a. The at least one sprocket (e.g. the first and second sprockets 14 and 16) is attached to the sprocket attachment part 30 of the crank arm 12.

The sprocket attachment part 30 can be either integrally to or separate from the arm part 32. The sprocket attachment part 30 has a plurality (e.g. four) of sprocket attachment arms 34 disposed at intervals in the circumferential direction. The circumferential intervals of the sprocket attachment arms 34 may be equal intervals but may also be unequal intervals. In the first embodiment, the sprocket attachment arms 34 are disposed at equal intervals. Each of the sprocket attachment arms 34 has a first attachment part 34a for attaching the first sprocket 14. The first attachment parts 34a are formed at the distal ends of the sprocket attachment arms 34. Each of the sprocket attachment arms 34 has a second attachment part 34b for attaching the second sprocket 16. The second attachment parts 34b are formed farther inward in the radial direction than the first attachment parts 34a. The first attachment parts 34a and the second attachment parts 34b include through-holes or blind bores that are either threaded or not threaded. In the first embodiment, the first attachment parts 34a are configured with non-threaded through-holes, and the second attachment parts 34b are configured with blind screw holes. The first sprocket 14 is fixed to the first attachment parts 34a by first fixing bolts 36. The second sprocket 16 is fixed to the second attachment parts 34b by second fixing bolts (not shown).

The arm part 32 is formed either integrally with or separate from the sprocket attachment part 30. In the first embodiment, the arm part 32 is configured integrally with the sprocket attachment part 30. The pedal attachment part 32a defines a threaded hole in which a pedal (not shown) can be mounted in the distal end. The arm part 32 also includes a fixing hole 32b to which the crankshaft 28 is fixed.

Figure 3:
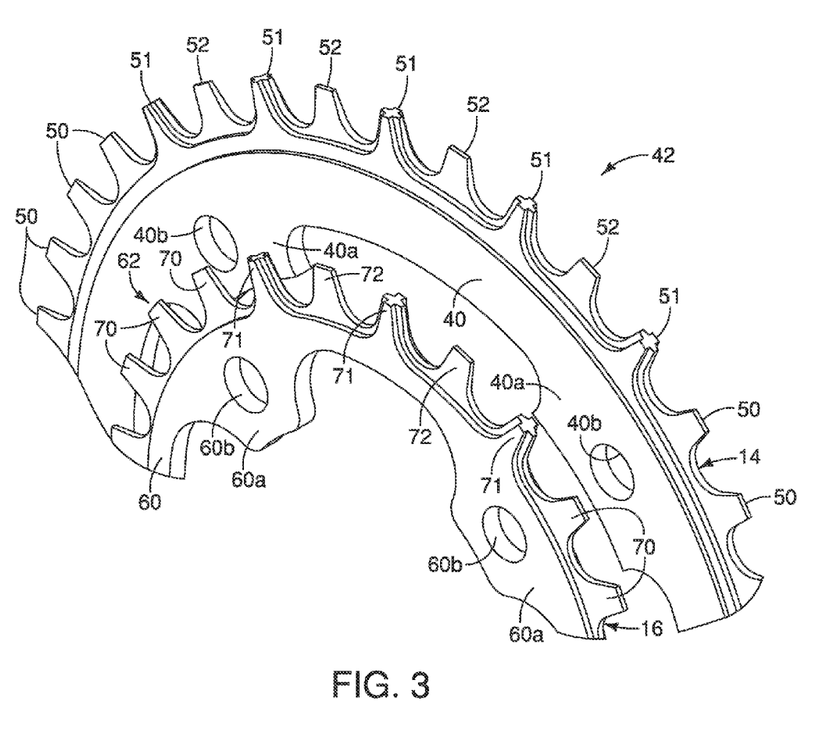
FIG. 3 is a partial inside perspective view, similar to FIG. 2, of the first and second sprockets of the bicycle crank assembly illustrated in FIG. 1, but without the bicycle chain.
Figure 4:
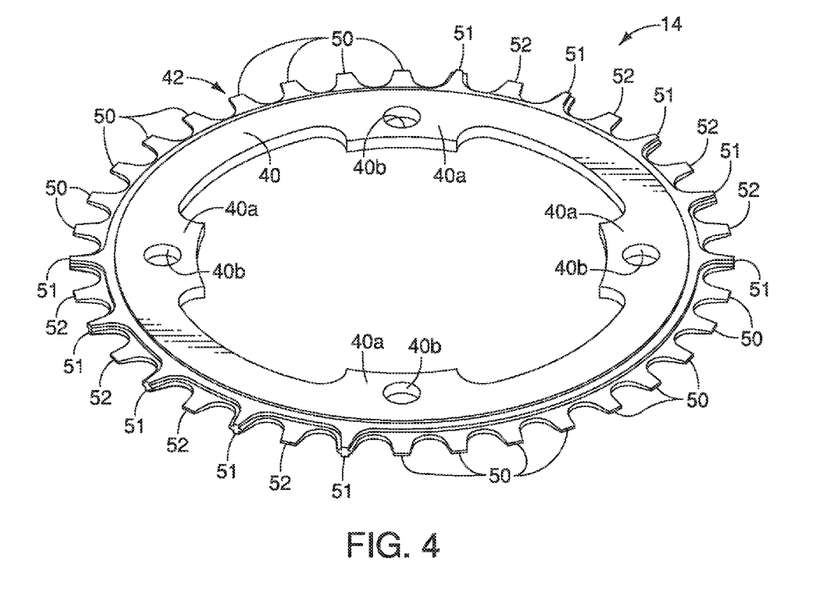
FIG. 4 is an outside perspective view of the first sprocket of the bicycle crank assembly illustrated in FIGS. 1 to 3.
Figure 5:
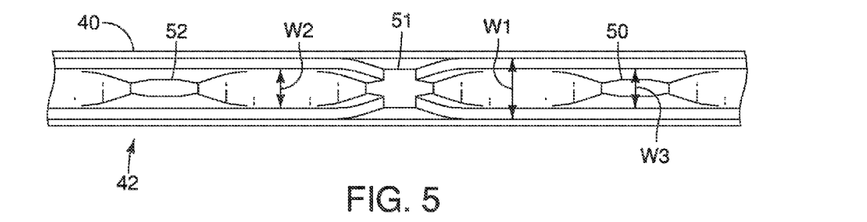
FIG. 5 is a partial edge view of the first sprocket illustrated in FIG. 4 showing one of the regular teeth, one of the first teeth and one of the second teeth of the first sprocket.
Figure 6:
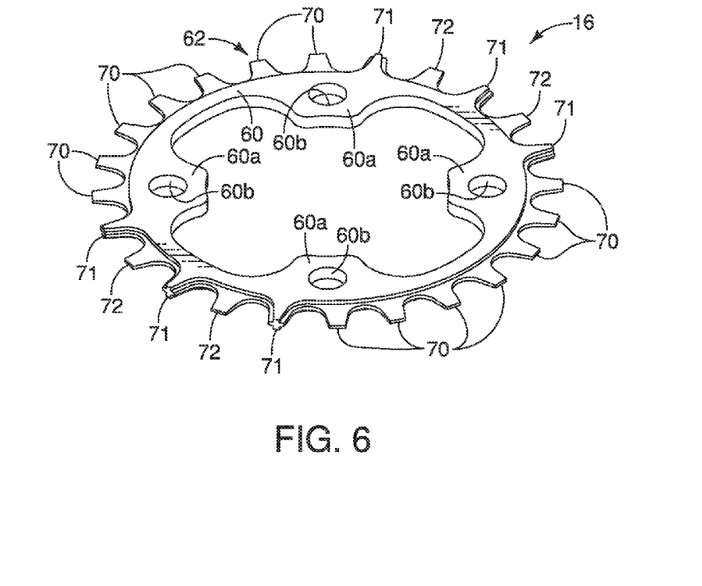
FIG. 6 is an outside perspective view of the second sprocket of the bicycle crank assembly illustrated in FIGS. 1 to 3.
Figure 7:
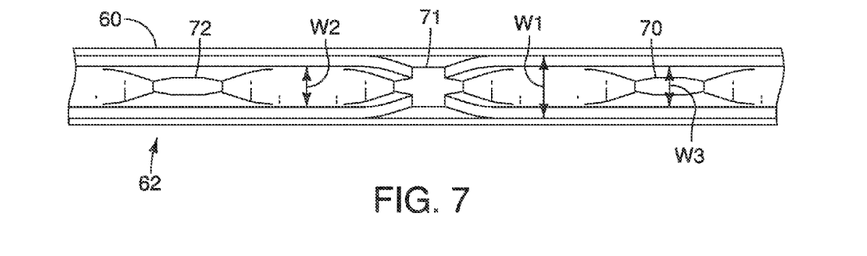
FIG. 7 is a partial edge view of the second sprocket illustrated in FIG. 6 showing one of the regular teeth, one of the first teeth and one of the second teeth of the second sprocket.

As seen in FIGS. 3 to 5, the first sprocket 14 includes a first sprocket main body 40 and a plurality of teeth 42. Thus, broadly speaking, at least one sprocket (e.g. the first sprocket 14) has a plurality of teeth 42 that are formed about a periphery of the at least one sprocket. The first sprocket main body 40 and the teeth 42 are made of metal, and are preferably formed integrally as a one-piece, unitary member. The first sprocket main body 40 has a plurality (e.g. four) of first fixed parts 40a for fixing to the first attachment parts 34a of the sprocket attachment arms 34. In the first embodiment, the first fixing parts 40a include through-holes 40b. The first sprocket 14 is fixed to the sprocket attachment arms 34 by the first fixing bolts 36 and a nut member (not shown) threaded with the first fixing bolts 36 in a conventional manner.

Here in the first embodiment, for example, the first sprocket 14 has thirty-six of the plurality of teeth 42. Thus, a total number of the plurality of teeth 42 is even for the first sprocket 14. The plurality of teeth 42 include a set of regular teeth 50 and a set of first and second sprocket teeth 51 and 52. In the first embodiment, there are two sets of the regular teeth 50 in which all of the regular teeth 50 are configured to fit into the inner links 22 to assume a chain driving position (i.e., a fully seated position). Thus, the term "regular teeth" or "regular tooth" as use herein refers to teeth or a tooth having a predetermined axial width capable of operatively engaging both inner and outer links of a bicycle chain to drive the chain such that the chain is properly seated on the sprocket during normal use. Thus, a "regular tooth" as referred to herein does not require a tooth to be a straight symmetrical tooth. Rather "regular teeth" can be asymmetrical teeth, twisted teeth, shifting teeth with shifting features, and the like. Further, the regular teeth can include at least one shifting tooth for shifting a bicycle chain from one sprocket to another sprocket. Also the term "set" as used herein with respect to teeth refers to at least three consecutive teeth. Thus, a set of regular teeth requires at least three consecutive regular teeth. Also, as seen in FIG. 4, a set of first and second teeth includes either at least two first teeth and at least one second tooth consecutively arranged, or at least two second teeth and at least one first tooth consecutively arranged. At least some of the first teeth 51 and the second teeth 52 are disposed alternately in the circumferential direction, i.e. adjacent to each other, as shown in FIG. 4.

The regular teeth 50 are identical to the second teeth 52 in terms of height in the radial direction and axial width in the axial direction. The regular teeth 50 are disposed along at least one of a top dead center area TDC and a bottom dead center area BDC with respect to the crank arm 12. Preferably, the regular teeth 50 are disposed along both the top dead center area TDC and the bottom dead center area BDC with respect to the crank arm 12. As used herein the terms "top dead center area" and "bottom dead center area" refer to an area of not more than forty-five degrees in each direction from the longitudinal center line L of the crank arm 12. In the first embodiment, for example, the top dead center area TDC and the bottom dead center area BDC having the regular teeth 50 is equal to or less than forty-five degrees in each direction from the longitudinal center line L of the crank arm 12. Here in the first embodiment, for example, the top dead center area TDC and the bottom dead center area BDC both have the regular teeth 50 disposed along approximately ninety degrees in the vicinity of both the top dead center area TDC and the bottom dead center area BDC. Also in the first embodiment, for example, the regular teeth 50 are illustrated as straight symmetrical tooth. Since there are a total of thirty-six teeth in the first embodiment, there are nine of the regular teeth 50 at the top dead center area TDC and nine of the regular teeth 50 at the bottom dead center area BDC.

The first teeth 51 and the second teeth 52 are alternately disposed in a circumferential direction within a first region R1 and a second region R2. As seen in FIG. 1, the first and second regions R1 and R2 are disposed between the top dead center area TDC and the bottom dead center area BDC that include the regular teeth 50. Thus, the first and second teeth 51 and 52 are disposed along at least between the top dead center area TDC and the bottom dead center area BDC with respect to the crank arm 12.

As seen in FIG. 5, the first teeth 51 each have a first chain engaging tooth width W1 for engaging with the outer links 24 of the chain 20. The second teeth 52 each have a second chain engaging tooth width W2 for engaging with the inner links 22 of the chain 20. The first chain engaging tooth width W1 is greater than the second chain engaging tooth width W2. The regular teeth 50 each have a third chain engaging tooth width W3 that is smaller than the first chain engaging tooth width W1. The first chain engaging tooth width W1 of the first teeth 51 is preferably in a range from 2.5 mm to 5.4 mm, and more preferably in a range from 3.0 mm to 4.5 mm. When the first chain engaging tooth widths W1 of the first teeth 51 are in such a range, the first teeth 51 can readily engage the outer link plates 24a without engaging with the inner link plates 22a. The second chain engaging tooth width W2 of the second teeth 52 is preferably in a range from 1.5 mm to 2.3 mm. When the second chain engaging tooth-widths W2 of the second teeth 52 are in such a range, the second teeth 52 have the necessary rigidity and readily engage with the inner link plates 22a. The first teeth 51 are preferably formed into a "+" (plus) shape as seen from the radially outer side, as shown in FIG. 5. The second teeth 52 are preferably formed into a "−" (minus) shape as seen from the radially outer side. The first teeth 51 and the second teeth 52 taper so as to gradually decrease in axial width toward the radially outer side. The first teeth 51 and the second teeth 52 thereby engage more readily with the outer link plate 24a and the inner link plates 22a. In the first embodiment, the first teeth 51 are identical to the second teeth 52 in terms of height in the radial direction.

Now, the second sprocket 16 will be discussed with reference to FIGS. 1 to 3, 6 and 7. Basically, the second sprocket 16 has the same configuration as the first sprocket 14, except that the second sprocket 16 is smaller than the first sprocket 14 and has fewer teeth than the first sprocket 14. In view of the similarity of the first and second sprockets 14 and 16, the second sprocket 16 will only be briefly discussed herein.

The second sprocket 16 includes a second sprocket main body 60 and a plurality of teeth 62. The second sprocket main body 60 and the teeth 62 are made of metal, and are preferably formed integrally as a one-piece, unitary member. The second sprocket main body 60 has a plurality (e.g. four) of second fixed parts 60a for fixing to the second attachment parts 34b (see FIG. 1) of the sprocket attachment arms 34. The second fixed parts 60a are configured from through-holes. The second sprocket 16 is fixed to the sprocket attachment arms 34 by the second fixing bolts (not shown) that are threaded into blind bores of the second attachment parts 34b.

Here in the first embodiment, for example, the second sprocket 16 has twenty-four of the plurality of teeth 62. Thus, a total number of the plurality of teeth 62 is even for the second sprocket 16. The teeth 62 include a set of regular teeth 70 and a set of first and second sprocket teeth 71 and 72. In the first embodiment, there are two sets of the regular teeth 70 in which all of the regular teeth 70 are configured to fit into the inner links 22 to assume a chain driving position (i.e., a fully seated position). The regular teeth 70 and the first and second sprocket teeth 71 and 72 of the second sprocket 16 have the same configurations and the same axial widths as the regular teeth 50 and the first and second sprocket teeth 51 and 52 of the first sprocket 14, respectively, as discussed above. The second sprocket main body 60 has a plurality (e.g. four) of second fixed parts 60a for fixing to the second attachment parts 34b of the sprocket attachment arms 34. In the first embodiment, the second fixing parts 60a include through-holes 60b.

Referring now to FIGS. 8 to 12, a bicycle crank assembly 110 according to a second embodiment is illustrated. In the second embodiment, the bicycle crank assembly 110 comprises a crank arm 112, a first sprocket 114 and second sprocket 116. Here, the crank arm 112 is identical to the crank arm 12 as discussed above. Regarding the first and second sprockets 114 and 116, only descriptions of the differences of the first and second sprockets 114 and 116 from the first and second sprockets 14 and 16 will be provided.

Figure 8:
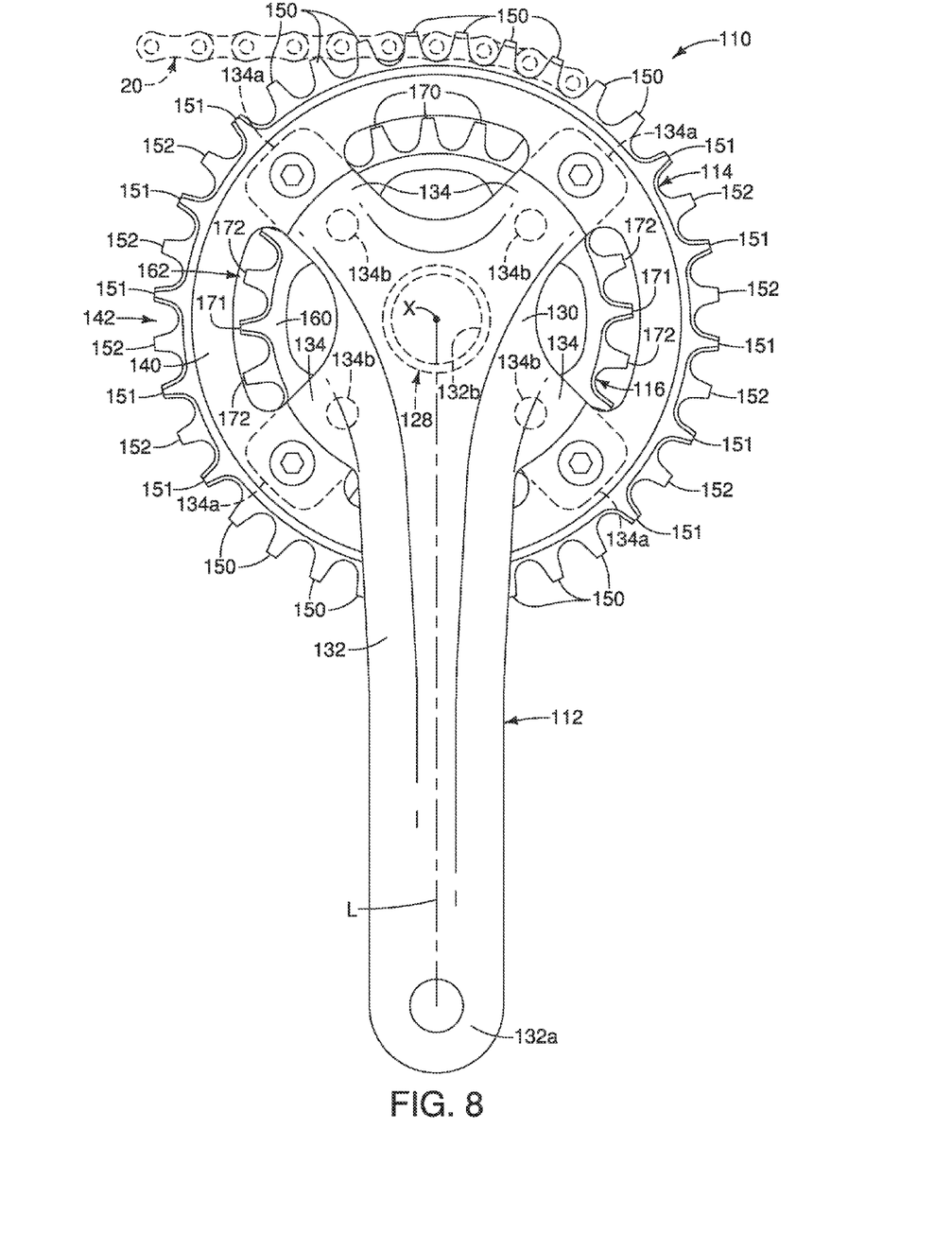
FIG. 8 is an outside elevational view of a bicycle crank assembly having first and second sprockets configured in accordance with a second embodiment.

As seen in FIG. 8, the crank arm 112 is integrally and non-rotatably fixed to one end of a crankshaft 128. The crank arm 112 has a sprocket attachment part 130 and an arm part 132 provided with a pedal attachment part 132a. The crank arm 112 has a longitudinal center line L that extends between the sprocket attachment part 130 and the pedal attachment part 132a. The first and second sprockets 114 and 116 are fixedly attached to the sprocket attachment part 130 of the crank arm 112 by four sprocket attachment arms 134. Each of the sprocket attachment arms 134 has a first attachment part 134a for attaching the first sprocket 114 and a second attachment part 134b for attaching the second sprocket 116 in the same manner as the first embodiment.

Figure 9:
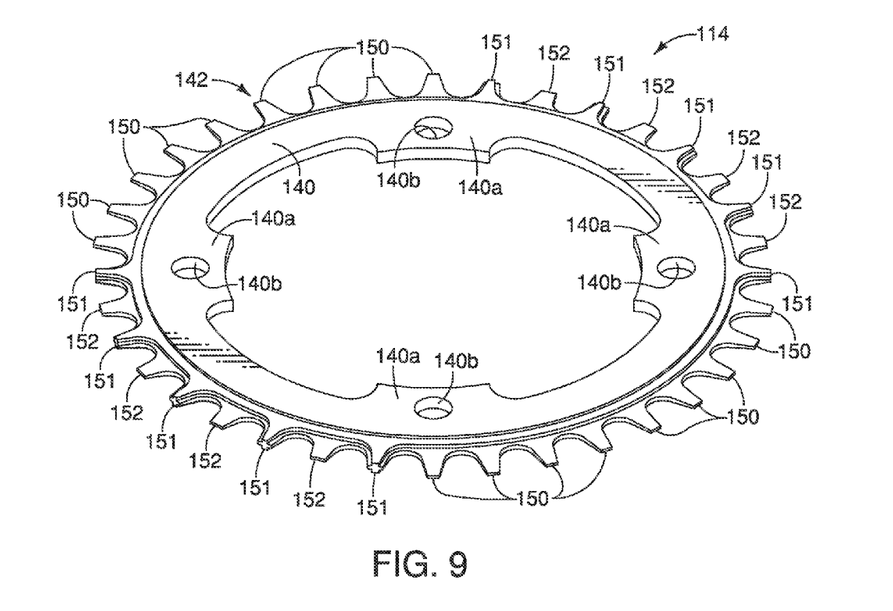
FIG. 9 is an outside perspective view of the first sprocket of the bicycle crank assembly illustrated in FIG. 8.
Figure 10:
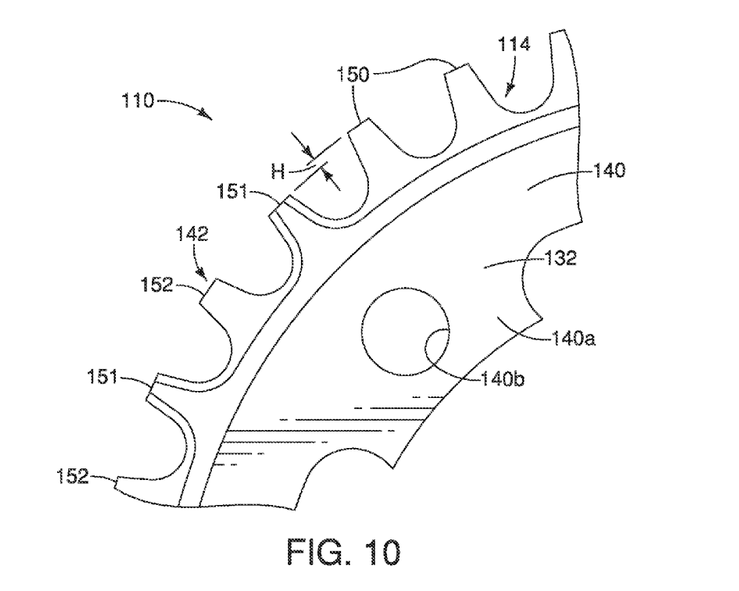
FIG. 10 is an outside elevational view of a portion of the first sprocket illustrated in FIG. 9.

As seen in FIGS. 9 and 10, the first sprocket 114 includes a first sprocket main body 140 and a plurality of teeth 142, which include a set of regular teeth 150 and a set of first and second sprocket teeth 151 and 152. The first and second sprocket teeth 151 and 152 are identical to the first and second sprocket teeth 51 and 52 as discussed above. The regular teeth 150 differ from the regular teeth 50 in that the regular teeth 150 are taller than the first teeth 151 and the second teeth 152 by an amount H as measured in a radial direction from a tooth root radius to a tooth tip. The amount H is preferably in a range from 0.5 mm to 2.5 mm.

Figure 11:
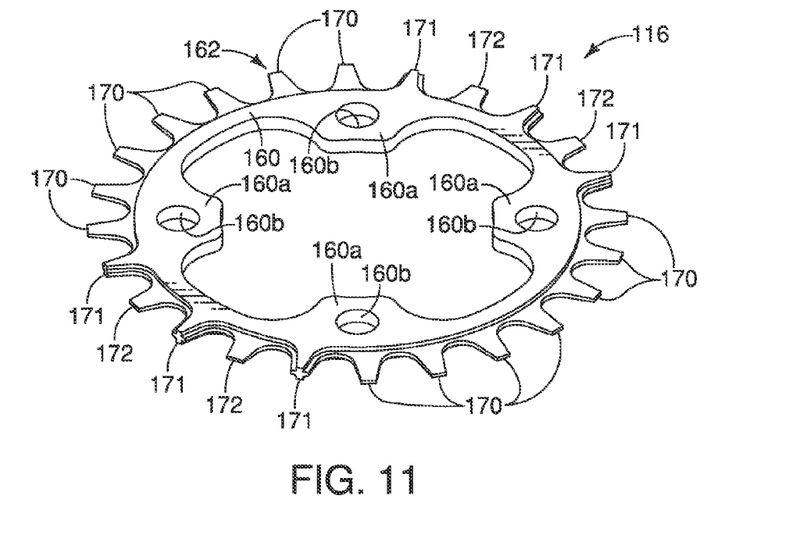
FIG. 11 is an outside perspective view of the second sprocket of the bicycle crank assembly illustrated in FIGS. 6 and 7.
Figure 12:
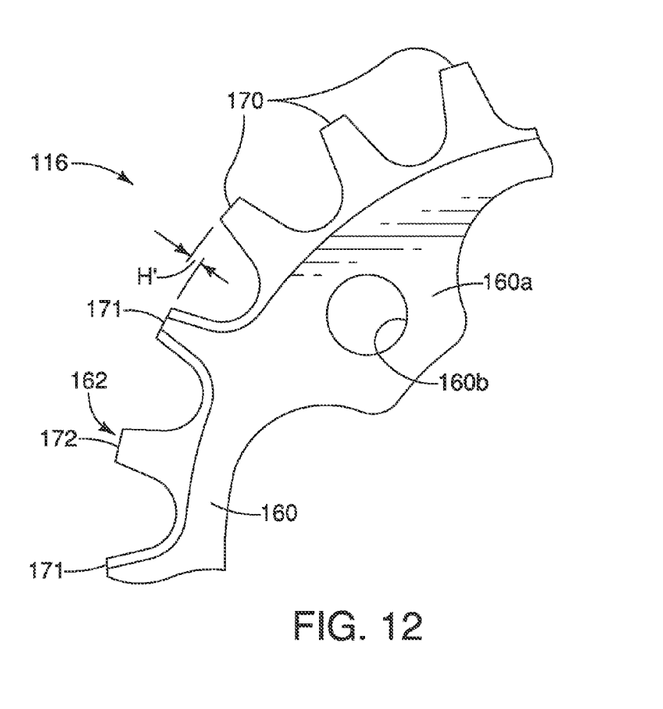
FIG. 12 is an outside elevational view of a portion of the second sprocket illustrated in FIG. 10.

As seen in FIGS. 11 and 12, the second sprocket 116 includes a second sprocket main body 160 and a plurality of teeth 162, which include a set of regular teeth 170 and a set of first and second sprocket teeth 171 and 172. The first and second sprocket teeth 171 and 172 are identical to the first and second sprocket teeth 71 and 72 as discussed above. The regular teeth 170 differ from the regular teeth 70 in that the regular teeth 170 are taller than the first teeth 171 and the second teeth 172 by an amount H' as measured in a radial direction from a tooth root radius to a tooth tip. The amount H' is preferably in a range from 0.5 mm to 2.5 mm.

Figure 13:
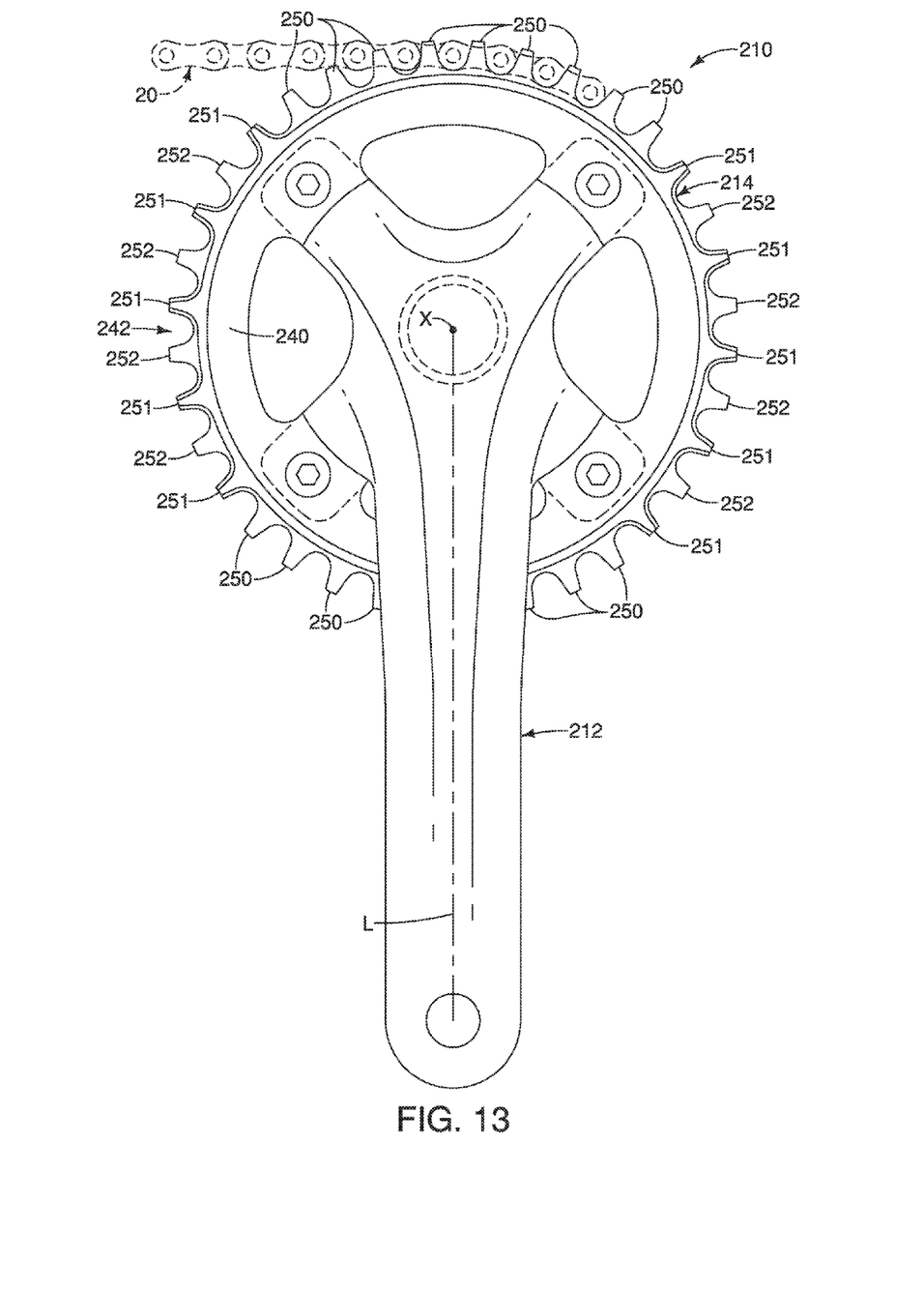
FIG. 13 is an outside elevational view of a bicycle crank assembly having a crank arm with only a single sprocket attach to the crank arm in accordance with a third embodiment.

Referring now to FIG. 13, a bicycle crank assembly 210 according to a third embodiment is illustrated. Here, the bicycle crank assembly 210 has a crank arm 212 with only a single sprocket 214 attached to the crank arm 212. With the bicycle crank assembly 210, the bicycle chain 20 does not easily disengage from the sprocket 214 when, for example, riding on a rough terrain.

Here, the crank arm 212 is identical to the crank arm 12, as discussed above, except that the second attachment part has been eliminated from the crank arm 212 such that only the sprocket 214 can be attach to the crank arm 212. The sprocket 214 is identical to either the first sprocket 14 or the first sprocket 114. In FIG. 13, the sprocket 214 is illustrated as being identical to the first sprocket 114. Thus, the sprocket 214 includes a sprocket main body 240 and a plurality of teeth 242, which include two sets of regular teeth 250 and two sets of first and second sprocket teeth 251 and 252. The crank arm 212 has a longitudinal center line L that extends from a rotational center axis X of the sprocket 214 similar to the prior embodiments. In view of the similarity of the crank arm 212 and the sprocket 214 to the corresponding parts of the prior embodiments, as discussed above, the crank arm 212 and the sprocket 214 will not be discussed and/or illustrated in further detail.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the changes do not substantially affect their intended function.

Also in the bicycle crank assembly of the first and second embodiments, the first and second teeth having different axial widths are provided to all of the sprockets, but the present invention is not limited as such. In other words, the second sprocket 16 or 116 can be configured with all regular teeth. Furthermore, while each of the bicycle crank assemblies 10 and 110 has only two sprockets, it will be apparent from this disclosure that the bicycle crank assemblies 10 and 110 can include a third sprocket.

In the first to third embodiments, the first teeth were formed into + shapes as seen from the radially outer side, but the present invention is not limited as such. These teeth may also be formed into other shapes such as diamonds, trapezoids, triangles, and hexagons.

In the first to third embodiments, there are four sprocket attachment arms, but the number of sprocket attachment arms is not limited to four.

In the first to third embodiments, the sprocket main bodies and the pluralities of teeth are formed integrally, but the present invention is not limited as such. The sprocket main bodies and the pluralities of teeth may be formed separately. The pluralities of teeth may be made of metal, for example, and the sprocket main bodies may be made of a synthetic resin such as a carbon fiber reinforced resin or a different metal than the teeth, for example (a light metal such as aluminum, for example), to reduce weight.

As used herein, the following directional terms "left" and "right" are used to indicate the "right" when referencing from the right side as viewed from the rear of the bicycle, and the "left" when referencing from the left side as viewed from the rear of the bicycle. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

Thus, the foregoing descriptions of the embodiments according to the present invention are provided for illustration only, and not for the purpose of limiting the invention as defined by the appended claims and their equivalents.

What is claimed is:

1. A bicycle crank assembly comprising:
a crank arm; and
at least one sprocket having a rotational center axis and a plurality of teeth formed about a periphery of the at least one sprocket,
the plurality of teeth including a set of regular teeth and a set of first and second teeth, the first teeth having a first chain engaging tooth width for engaging with an outer link of a bicycle chain, the second teeth having a second chain engaging tooth width for engaging with an inner link of the bicycle chain, the first chain engaging tooth width being greater than the second chain engaging tooth width, the regular teeth having a third chain engaging tooth width being smaller than the first chain engaging tooth width, the regular teeth including at least three consecutive teeth centered in at least one of a top dead center area and a bottom dead center area with respect to the crank arm, the first and second teeth being disposed between the top dead center area and the bottom dead center area with respect to the crank arm.

2. The crank assembly according to claim 1, wherein the crank arm has a sprocket attachment part, a pedal attachment part and a longitudinal center line extending between the sprocket attachment part and the pedal attachment part.

3. The crank assembly according to claim 2, wherein the at least one sprocket is attached to the sprocket attachment part of the crank arm.

4. The bicycle crank assembly according to claim 1, wherein
the first teeth and the second teeth are alternately disposed in a circumferential direction.

5. The bicycle crank assembly according to claim 1, wherein
the regular teeth are disposed along both the top dead center area and the bottom dead center area.

6. The bicycle crank assembly according to claim 1, wherein
the regular teeth are taller than the first teeth and the second teeth as measured in a radial direction from a tooth root radius to a tooth tip.

7. The bicycle crank assembly according to claim 1, wherein
a total number of the plurality of teeth is even.

8. The bicycle crank assembly according to claim 1, wherein
the first chain engaging tooth width of the first teeth is in a range from 2.5 mm to 5.4 mm.

9. The bicycle crank assembly according to claim 8, wherein
the second chain engaging tooth width of the second teeth is in a range from 1.5 mm to 2.3 mm.

10. The bicycle crank assembly according to claim 1, wherein
the second chain engaging tooth width of the second teeth is in a range from 1.5 mm to 2.3 mm.

11. The bicycle crank assembly according to claim 1, wherein
the at least one sprocket consists of only a single sprocket, and the single sprocket is attached to the crank arm.

12. The bicycle crank assembly according to claim 1, wherein
the second chain engaging tooth width is equal to the third chain engaging tooth width.

13. The bicycle crank assembly according to claim 1, wherein
the first teeth and the second teeth taper so as to gradually decrease in axial width in a radial direction.

14. The bicycle crank assembly according to claim 1, wherein
the at least one sprocket comprises a second sprocket, the second sprocket including a plurality of teeth formed about the periphery of the at least one sprocket, and all of the plurality of teeth are regular teeth.

* * * * *